Sept. 8, 1953     L. C. BRISSON     2,651,384
BRAKE
Filed Feb. 28, 1951     2 Sheets-Sheet 1
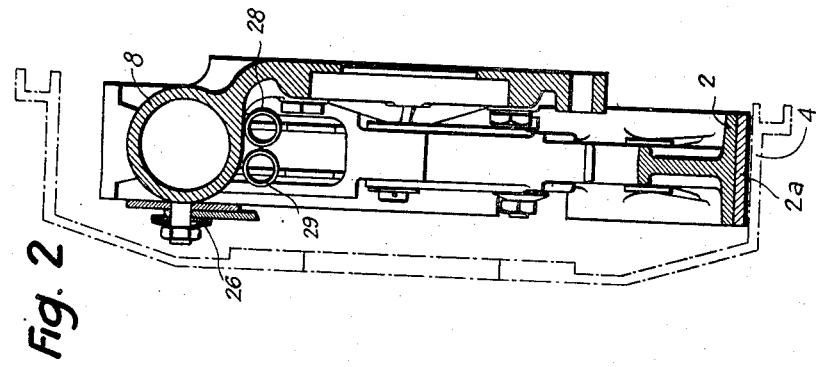
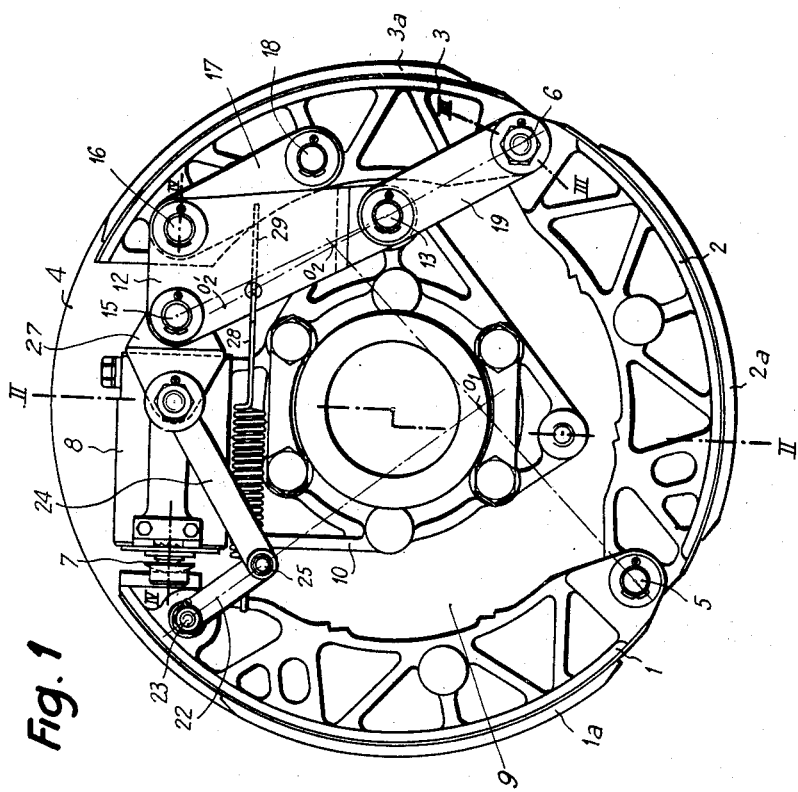
INVENTOR
LOUIS CHARLES BRISSON
ATTORNEY Sept. 8, 1953 L. C. BRISSON 2,651,384
BRAKE
Filed Feb. 28, 1951 2 Sheets-Sheet 2
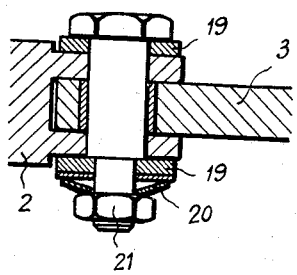
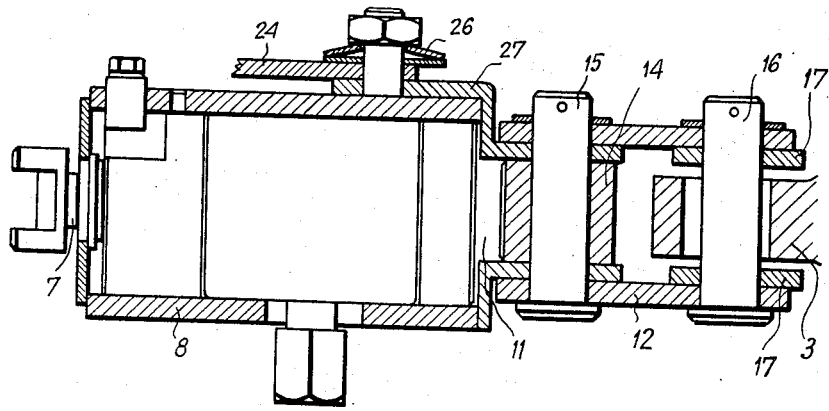
INVENTOR
LOUIS CHARLES BRISSON
ATTORNEY Patented Sept. 8, 1953

2,651,384

UNITED STATES PATENT OFFICE 2,651,384

BRAKE

Louis Charles Brisson, Vineuil, France

Application February 28, 1951, Serial No. 213,261
In France February 2, 1951

6 Claims. (Cl. 188—78)

This invention generally relates to friction brakes, and more particularly to brakes of the type described and shown in the co-pending U. S. Letters Patent application Serial No. 20,577, filed on February 6, 1951, for "Improvements in Brakes."

In the said co-pending application, a brake construction was disclosed comprising an interlinked annular plurality of arcuate brake segments or shoes extending substantially throughout the peripheral braking surface of a brake drum and adapted to be simultaneously applied against said drum braking surface with a uniform pressure by an expanding (or contracting) movement of said annular plurality under the action of an actuating or expander means, such as a hydraulic brake receiver cylinder, with the oppositely-projecting pistons of which the end segments of said plurality are in abutting engagement, the adjacent segments in the plurality being interconnected by cylindrical pivot pins having real pivotal centres, while the instantaneous centre of rotation (i. e. the center of curvature of the curved paths described by each point of the segment) and the pivotal point of the endmost segment in the plurality, in the direction of forward rotation, are coincident and both practically situated at infinity.

It is the general object of the present invention to provide certain practical improvements in a brake construction of the type just described. A more specific object is to provide in such a brake improved frictional means for centring the individual segments both during application and release of the brakes. A further specific object is to provide improved centring means for the brake segments in which the centring of the individual segments is automatic, simple, reliable and efficient, and is not disturbed when the brake is applied during reverse drive. A yet further object is to provide in such a brake an improved linkage connection between the rearward expander piston and the rearmost brake segment. And an object is to provide therein an improved spring arrangement operative to retain the segments in a condition of neutral equilibrium in the normal position thereof.

According to a first feature of this invention, the endmost segment in the plurality, in the direction of forward rotation, is in abutting engagement with the rearmost projecting piston of the expander cylinder through the medium of a parallel pair of links one of which is pivoted at one of its ends on a fixed fulcrum and at its other end on the pivotal point of said endmost segment with the adjacent segment, while the other link is pivoted at one end to the said endmost segment and at its other end to an intermediate element which in turn is pivoted on the said fixed fulcrum and abuttingly engages both the body of the expander cylinder and the end face of the rear expander piston thereof.

According to another feature, the $n$ interlinked segments of the plurality are centred by means of $(n-1)$ friction units, the friction unit relating to the initial segment being made inoperative during reverse rotation.

According to a further feature, the last two segments are centred, in either direction of rotation, by means of a common friction unit.

In one specific embodiment of this invention, a common friction unit is mounted on the pivotal point between the last two segments with one of the afore-mentioned abutment links.

Further, in a specific embodiment of the invention, the foremost or initial segment is centred through the medium of a lever directed towards the instantaneous centre of rotation of the said segment. In this embodiment, the said centering lever of the initial segment is pivoted on a link mounted for frictional engagement fit on an element adapted to be stationary during brake-application in forward rotation, and acquiring a certain amount of freedom during brake-application in reverse rotation.

Further according to the invention, the instantaneous centre of rotation of the last segment but one, is located, in reverse rotation substantially in the direction of the afore-mentioned abutment link pivoted to the pivotal point of the last two segments.

According to yet a further feature of the invention, the position of the aforesaid fixed fulcrum is so selected that the bearing direction of the endmost segment (which, in reverse rotation, becomes the leading segment) is, in reverse, substantially normal to the braking surface, or at any rate, that the said segment should present no point of zero pressure thereon.

According to yet another feature, a pair of return springs are used disposed substantially in parallel relationship, one of said springs being attached at one end to the foremost segment and at the other end to the endmost segment, while the other spring is attached at one end to the foremost segment and at the other end to the afore-mentioned intermediate element, thereby to provide a condition of substantially neutral or indifferent equilibrium in the normal position.

The above and further objects, features and the advantages of the invention will appear from the ensuing disclosure made with reference to the accompanying drawings, which diagrammatically illustrate a preferred form of embodiment of the invention selected by way of example but not of limitation.

Fig. 1 is a front view of an improved expanding brake assembly according to the present invention.

Fig. 2 is a section on line II—II of Fig. 1.
Fig. 3 is a section on line III—III of Fig. 1 and
Fig. 4 is a section on line IV—IV of Fig. 1.

As shown in the drawings, the improved brake assembly comprises three interlinked segments 1, 2 and 3, provided on their arcuate outer surfaces with friction linings 1a, 2a, 3a respectively, adapted to co-operate with the inner surface of a brake drum 4. The segments 1 and 2 are interpivoted on a pivot 5 and the segments 2 and 3 on a pivot 6. The free end of segment 1 abuttingly engages the end of a forward piston 7 of a brake-actuating or expander member consisting of a hydraulic brake receiver cylinder 8 mounted on the fixed disc 9 of the brake by means of a bracket or the like 10. The free end of the segment 3 engages the opposite or rear piston 11 of the expander cylinder through an intermediate element 12 pivoted on a fixed fulcrum 13 on the brake disc 9. The intermediate member 12 abuttingly engages (see Fig. 4) both the body of the expander cylinder 8 and the end face of the rear piston 11 thereof through a clevis 14 on which said intermediate member 12 is pivoted by a pin 15.

The intermediate part 12 is furthermore pivoted by a pin 16 to a pair of abutment links 17 which at their other ends are pivoted by a pivot pin 18 to the endmost segment 3.

A further pair of abutment links 19 parallel with the first pair 17 are pivoted on the fixed fulcrum 13 and on the common pivot 6 of the segments 2 and 3. The provision of the two pairs of parallel links 17 and 19 gives the possibility of providing for the necessary relative movements between the various components with extremely low friction stresses.

The position of the fixed fulcrum 13 is so predetermined that the instantaneous centre of rotation of the segment 2, in reverse rotation, lies substantially on the centre line of the abutment link 19; in Fig. 1, this instantaneous centre of rotation is indicated at O'2.

The instantaneous centre of rotation of the segment 2 in forward drive is indicated as O2 in Fig. 1. It will be seen that the distance between O2 and the fixed fulcrum 13 is very short so that O2 and 13 may be practically considered as coincident.

Owing to the feature that the instantaneous centre of rotation O'2 of segment 2 in reverse drive, lies in the direction of the link 19, the correct centring of the segment 2 during brake application in reverse rotation, is not at all disturbed.

The arrangements provided by this invention will now be described which make for an entirely automatic centring of the segments both during the brake-applying (expanding) movements and during the brake-release (contracting) movements of the segments.

According to a first of these arrangements, the segments 2 and 3 and the link 19 are pivoted on the pin 6 through the medium of a friction unit comprising, for example as shown in Fig. 3, a spring-washer 20 clamped against a clevis formed at the end of the segment 2 by a nut 21.

Further, the segment 1 is centred through a lever 22 directed towards the instantaneous centre of rotation O1 of segment 1; said lever 22 is freely pivoted to the segment 1 at 23 at one of its ends and to a link 24 at its other end, by a free pivotal or toggle connection 25. The link 24 is frictionally mounted by means of a spring washer 26 for example (see Fig. 4) on a part 27 which, upon application of the brake in forward rotation, is blocked owing to the fact that the said part 27 is applied against the body of the fixed expander cylinder 8 (the link 24 being frictionally mounted on the part 27, stationary in this condition, is also practically stationary upon brake application in forward rotation), while said part 27, upon brake application in reverse rotation, acquires a limited amount of freedom because it is then moved away from the body of expander 8 under the action of the rear piston 11 of the expander acting on the clevis 14 to which the part 27 is pivoted by means of the pin 15.

Because the centring lever 22 of segment 1 is pivoted on the link 24 which is stationary upon brake-application in forward, but acquires a certain amount of freedom during brake-application in reverse drive, instead of being pivoted on a positively fixed point of the brake-disc, the properly centred condition of the brake segment assembly is not disturbed when the brakes are applied during reverse drive.

In order to provide a condition of substantially neutral or indifferent equilibrium in the normal position, the pair of springs 28 and 29 (see especially Fig. 2) are provided for restoring the segments; the spring 28 is attached at one end to segment 1 and at the other to the intermediate member 12, and the spring 29 is attached at one end to segment 1 and at the other to segment 3.

It will be noted that the position of the fixed fulcrum 13 on the brake disc 9 should be so predetermined that, in reverse drive, the bearing direction of segment 3 (which then constitutes the foremost or leading segment) should be substantially normal to the friction surfaces, or at any rate, so that the said segment should have no point throughout its extent at which the bearing pressure is zero.

It will be apparent from the foregoing disclosure that the invention provides a brake assembly of the type comprising an expanding annular chain of interpivoted segments, of which the construction is greatly simplified owing to the fact that, in particular, the pivotal axis for the abutment link 19 is the same as that used for interpivoting the segments 2 and 3 to each other, and in which the centring action for the segments is entirely automatic and at the same time simple, reliable and efficient, and is not disturbed when the brake is applied during reverse drive, and one in which, furthermore, a condition of substantially neutral or indifferent equilibrium is provided for the brake in normal position.

It is of course to be understood that additions, alterations and omissions may be made to, in and from the structural details illustrated and described within the scope and spirit of this invention. Among other changes, the number of brake segments used may be greater or smaller than the three shown.

What I claim is:

1. In a brake assembly of the type described, a cylindrical braking surface, an expansible annular plurality of interpivoted brake segments having friction surfaces adapted to co-operate with said braking surface upon expansion of said segments, an expander unit interposed between the adjacent ends of a foremost and an endmost one on said segments and constituted by a fixed body in which there are arranged oppositely projectable pusher pistons, abutting means between the end of said foremost segment and the forward piston, and intermediate linkage means between the rearward piston and the end of said endmost segment, said linkage means comprising first link means having one end pivoted on said endmost segment and second link means having one end pivoted on the common pivot of said endmost with the endmost segment but one, both said link means coacting to provide a parallel linkage system, an intermediate element having one point pivoted to the other end of said first link means and another point pivoted to the other end of said second link means and to a fixed fulcrum, said intermediate element normally abutting the fixed body of said expander means and being actuated by said rearward piston for brake application in reverse drive.

2. In a brake assembly of the type described, a cylindrical braking surface, an expansible annular plurality of interpivoted brake segments having friction surfaces co-operable with said braking surface upon expansion of said plurality, a fixed expander unit interposed between adjacent ends of a foremost and an endmost one of said segments and having opposite pusher pistons projectable in forward and reverse drive towards said foremost and said endmost segment respectively, abutting means between the end of said foremost segment and said forward piston and intermediate abutting linkage means between said rearward piston and the end of said endmost segment, friction element provided on some of pivotal points of said segments, the number of said friction elements being equal to the number of segments minus one, and means for rendering the friction elements associated with said foremost segment inoperative upon projection of said rearward piston.

3. Brake assembly as in claim 2 which comprises a pair of toggle links, one free end of said pair pivoted to the free end of said foremost segment, means abutted against the fixed expander unit and moved away therefrom by projection of said rearmost piston, and a frictional pivotal connection between the other free end of said toggle-link pair and said means.

4. Brake assembly as in claim 2 which includes a friction means common to said endmost segment and the endmost segment but one.

5. Brake assembly as in claim 2, wherein said intermediate abutting linkage includes a link pivoted at one end on the common pivot of the end segment and the end segment but one and at the other end on a fixed fulcrum, and wherein said common friction means is provided on said common pivot of both said segments with said link.

6. In a brake assembly of said type described, a cylindrical braking surface, an expansible annular plurality of interpivoted brake segments having friction surfaces co-operable with said braking surface upon expansion of said segments, a fixed expander unit interposed between adjacent ends of a foremost and an endmost one of said segments and having opposite pistons projectable towards said foremost and said endmost segment respectively, abutting means between the end of said foremost segment and the forward piston, a member normally abutted against the fixed expander unit and moved away therefrom by projection of the rearward piston, a pair of toggle-links having one free end pivoted to said end of the foremost segment and frictional pivotal means connecting the other free end of said pair to said member, an intermediate element pivoted to a fixed fulcrum at one point thereof, means pivoting another point of said element to said member, a parallel linkage including a first link respectively pivoted to the endmost segment and to a third point of said intermediate element, and a second link respectively pivoted to the common pivot of the endmost segments with the endmost segment but one, and to said fixed fulcrum, and frictional means on said common pivot of said last-mentioned segments with said second link.

LOUIS CHARLES BRISSON.

References Cited in the file of this patent

UNITED STATES PATENTS

| Number | Name | Date |
|---|---|---|
| 2,131,369 | Brisson | Sept. 27, 1938 |
| 2,237,650 | Brisson | Apr. 8, 1941 |